United States Patent [19]
Harris

[11] 3,810,012
[45] May 7, 1974

[54] APPARATUS FOR AUTOMATICALLY EVALUATING THE VOLTAGE AT A NUMBER OF TEST POINTS SEQUENTIALLY

[75] Inventor: Edward Paul Harris, Bognor Regis, England

[73] Assignee: Rosemount Engineering Company Limited, Bognor Regis, England

[22] Filed: Oct. 17, 1972

[21] Appl. No.: 298,239

[52] U.S. Cl............................................ 324/73 R
[51] Int. Cl.......................................... G01r 15/12
[58] Field of Search................................ 324/73 R

[56] References Cited
UNITED STATES PATENTS
3,065,414  11/1962  Sears et al........................ 324/73 R
3,226,637  12/1965  Hempel............................. 324/73 R
3,453,539  7/1969  Crockette et al.................. 324/73 R Primary Examiner—Robert J. Corcoran
Attorney, Agent, or Firm—Dugger, Johnson & Westman

[57] ABSTRACT

Automatic test equipment primarily for printed circuit boards in which each test point is connected sequentially via a scanner and isolating amplifier across a single set of series connected resistors, the resistors in the set being adjusted for each test point in synchronism with the scanner and to a programme to a value for each point such that when a preassigned input potential is present for a test point a standard voltage is produced across a precision resistor included in the set of resistors, the voltage being compared with a standard voltage source and the result of the comparison indicating the deviation of the test point voltage from that assigned.

8 Claims, 9 Drawing Figures

APPARATUS FOR AUTOMATICALLY EVALUATING THE VOLTAGE AT A NUMBER OF TEST POINTS SEQUENTIALLY

BACKGROUND OF THE INVENTION

This invention relates to a method and apparatus for sampling and evaluation of potentials at, or derived from, a number of test points of electrical circuits, these potentials being related to the parameters under examination. The invention is primarily, but not essentially, concerned with the automatic testing of printed circuit boards. Whilst the following description is concerned with such testing it will be understood that the broad method and apparatus can be used where it is required to sample and evaluate the parameters existing at a number of test points to determine whether said parameters are at, or within, the preassigned acceptable or "target" limits for that point.

Apparatus for testing circuit boards by sampling the voltage at various selected points on the board is known but use of such apparatus has been restricted by high capital cost and generally limited testing capability with respect to versatility and the parameters which can be evaluated. Such apparatus generally employs either some method of scaling directly at the input in conjunction with a subsequent level-sensing or zero-crossing detector, or means to convert input levels into binary coded digital signals for subsequent processing by electronic gates or logic circuitry. The former method imposes restrictions on the input impedance which can be attained, while the latter method is complex and possesses an inherent error of at least plus or minus one least significant bit.

One object of this invention is to provide a method of testing potentials at or derived from a number of test points in a manner which does not substantially affect the circuit under test or introduce significant errors.

Another object is to provide an apparatus for evaluation of potentials at a number of test points and for which the apparatus may be programmed with values for each individual point.

A further object of a preferred embodiment of this invention is to provide a testing apparatus for printed circuit boards which may be arranged to perform a test sequence automatically and which incorporates a mounting and connecting matrix for the board to be tested which also includes means to provide the apparatus with information on the upper and lower limit "target" values for each test point to be examined in the test sequence.

SUMMARY OF THE INVENTION

According to this invention there is provided means for the evaluation of a number of parameters each represented by a potential derived from but related to the said parameters, the apparatus having an input scanner for sampling each point in turn and applying the resulting potential to a set of resistors, a switching means for connecting the resistors in the set to produce an overall division ratio for each sample so that a preassigned target value of potential for the sample would produce a standard output voltage and means for determination of the deviation of the voltage produced by the sampled potential from the standard voltage.

The series of resistors may, for convenience of setting, be in decimal or binary sequence and preferably a number of decades in a 8,4,2,1, binary coded decimal sequence ratio is provided, the switching means connecting resistors in circuit appropriate to the target potential selected for a particular sample. The grounded or bottom end of the resistor series includes a precision resistor across which a voltage is developed proportional to the current through the resistors. If BCD value of resistors are used the precision resistor may be equivalent to BCD 1. For every potential sampled at the input the resistor chain is set so that a target value of potential produces the standard voltage across the precision resistor, any deviation of the sample from the target producing a corresponding deviation from the standard voltage appearing across the precision resistor.

The voltage across the precision resistor may be passed to a comparator which is also fed with a reference voltage, the comparator indicating a deviation from the standard voltage and thus a deviation of the sampled potential from the target. The comparator may be arranged to supply an output signal the nature of which indicates the direction of deviation of the sample from the target.

According to a further feature of this invention the sampled potential at the input may be evaluated as lying between two limiting values by arranging for the resistor chain to be set to two target values in sequence for each sampled input the one defining an upper limit and the other the lower limit for the sampled potential, the comparator being arranged to give an acceptance signal when, in respect of the upper limit, the voltage fed to the comparator is below the reference voltage and in respect of the lower limit when the voltage is above the reference voltage, the output of the comparator being sensed in accordance with the setting of the series resistors across the input, i.e. whether same are set for the upper or lower target.

The sensing of the comparator output and the setting of the series resistor according to whether an upper or lower target value in being assessed is preferably achieved by a control circuit which calls up the appropriate upper or lower target value and instructs the comparator output logic as to whether the standard potential shall be greater or less than the reference voltage.

In a preferred embodiment switching means associated with each decade of series resistors in 8,4,2,1, BCD ratio is set for any decimal value in each decade by a code in decimal notation for each decade, the code being passed via a decimal to BCD converter serving to set the appropriate 8,4,2,1, decade. A separate code input is provided for each of the upper and lower target values, each code input forming a command for the BCD resistor chain. By means of a switching circuit controlled by a timing signal either the upper or lower target may be set by the switching means according to the command signal. This series of switching commands constitutes a programme of tests for the parameters under examination. For each input potential to be evaluated upper and lower target values are called up from the programme in decimal and the appropriate BCD target value is fed to control the switching means by the appropriate upper or lower timing signal. The input scanner is stepped sequentially from test to test and the appropriate limits called-up from the programme for each test. In the event that the actual parameter is outside the limit defined progression of the scanner is inhibited.

The apparatus is arranged to be controlled by a clock serving to step the input scanner and gate appropriate upper-lower target for each test.

A feature of the invention is that the replica of the input potential may be used to indicate the value of potential applied at the input.

An advantage of the invention is that when an isolating amplifier is used the input impedance presented at each test point is a constant and defined value for the measuring ranges of the apparatus in contrast to measuring techniques using pre-scaling at the test point inputs where the input resistance varies from test point to test point.

In the preferred embodiment of this invention there is provided a testing apparatus for printed circuit boards or the like electrical or electronic assemblies comprising a number of test point inputs each one of which is connected in turn via a scanning means and a buffer amplifier across a series of resistors which are set in value for each input by a switching means connected such that a target value of input potential assigned for each input would produce a standard potential across the precision resistor in the lower end of the resistor network, an evaluating device for determining the deviation of the potential produced across the standard resistor by the input potential from the test point, and a programming and mounting panel for printed circuit board, detachable from the apparatus, and including means for making connection with points on the board and coupling same with target values for each test point, the programming system controlling the switching means for setting the target for each input on the resistor network.

The programmed decimal notation may be driven by a source of voltage synchronised to the input scanner to select the upper and lower limits for each channel and this synchronised voltage made available for the control of external apparatus.

The mounting and connecting matrix to the test points of a board together with the programme of limit values unique to that board is contained on the panel thus arranging the apparatus for testing a new circuit board involves changing only a complete panel, which in turn adjusts the apparatus to the requirements of the test to be conducted.

The preferred testing apparatus to be described in conjunction with the drawings comprises two distinct sections which when associated constitute the complete apparatus. The method of evaluation uses a command matrix which is associated with one section, and the basic measuring system commanded by the matrix as the other section.

The first section of the apparatus comprises a combined programming and carrier plate one part of which functions as a base upon which is mounted a jig unique to the circuit to be tested that positions the circuit to be examined so that electrical connections are made to a series of standard spring loaded connections which contact those parts of the circuit corresponding to the points at which parameters are to be evaluated. On another part of this section is mounted a number of jack connectors which may comprise as example 600 independent outlets, associated with a number of matrix boards produced by printed circuit techniques the interconnections across which by means of steering diodes set commands for the measurement and functional tests to be conducted by the other part of the apparatus on the circuit fitted to the jig. Every circuit to be tested has its own programming and carrier plate the arrangement of which is unique to the requirements of that particular circuit and the tests which are to be performed. This part of the apparatus plugs into a flat bed top of the second part using a combined hinge and lever configuration which ensures correct registration between connecting jacks and a matching number of receptacles that transfer the matrixed information together with test point input levels into the second part of the apparatus.

Programming of the apparatus is by removal and interchange of the programming carrier plate fitted to the flat top of the main section of the equipment, and since the programme and jig are a single unit this technique offers the advantage that it is impossible for one to become divorced from the other.

It is the evaluation method and apparatus therefore used in the main apparatus which constitutes the main feature of this invention.

A preferred method of carrying out the invention comprises selecting the test point signal by a scanner and applying it to a non-inverting voltage follower amplifier functioning as an isolator the design of which ensures that the input signal experiences an exceedingly high impedance and is therefore, for all practical purposes, unloaded by its connection to the apparatus. The signal out of the isolator is a precise replica of the input signal both in sign and magnitude and, through the inherent characteristics of the non-inverting isolator, at a low source impedance so permitting it to be processed without causing changes to its level always provided that the loading imposed is markedly less than some defined maximum. Since this signal output is identical with the input it may be applied to analogue or digital metering circuits calibrated in terms of the input voltage and in the preferred embodiment of the invention this course is adopted. Following the isolating amplifier are a series of groups of resistors each group having its values selected according to 8,4,2,1, binary weighted law, the groups themselves being decade related. Across each resistor in each group is connected a reed relay or switch which allows individual resistors in a group to be shorted across, the relays or switching devices being normally in the open condition. Considering one BCD group of four resistors separately, if the four associated relays are energised by complementary BCD coded signals, then the total resistance existing between the ends of the four series connected resistors will follow the 8,4,2,1, BCD law according to the commands causing the switches to operate. In this respect binary 1 denotes a switch closed and binary 0 denotes a switch open. Assuming that a group of four resistors comprise the values 8 R, 4 R, 2 R and 1 R. With binary 1111, which is equal to decimal 15, at the input of the switching command, the complementary code will provide 0000 so that all switches are open, all resistors in circuit, and hence the total resistance will be 15 R. If decimal 6 is binary encoded in 8,4,2,1, code, the binary logic is 0110 the complement of which is 1001. Applied to the switching network then 8 R becomes shorted as does 1 R leaving 4 R plus 2 R in circuit giving a total of 6 R which is equal to the signal decimal number. Given a sufficient number of binary resistor decade groups connected between the output of the isolating amplifier and the common line it will be apparent that for any specified isolator output voltage, the total resistance in circuit may be adjusted so that a defined current flows through the resistor chain when the appropriate target voltage is applied to it resulting in a standard voltage being produced across a precision resistor in the lower end of the chain, the accuracy of the defined current with regard to any particular applied voltage being a function of the number of binary groups and the precision of the resistors employed. Particular advantages of this method of establishing a defined current are that only four resistors are needed to cover any single decade range, and that the overall accuracy given precision resistors is related to the number of decades. For example a four decade arrangement having a nominal maximum of 1,000 may be set so that the constant current error is not greater than ± 0.05 percent for any voltage at the output of the isolating amplifier. This technique of binary coded network switching to establish a constant current is the basis of the method and apparatus of the invention where it is used to reduce the output of the isolating amplifier down to some fixed level of voltage defined as the "standard voltage", this standard voltage being developed across a precision resistor fed from the BCD network which establishes the defined current relative to some specified output from the isolating amplifier. Consideration will show that while the current level may be established with binary coded command signals, the inherent accuracy of the least significant bit is a function of the accuracy of the analogue circuit which can be arranged to be substantially better than plus or minus one least significant bit which is the restraint contained in any purely binary system.

Arising from this technique this invention contemplates the use of the binary coded resistor network command signals to drive a read-out display which shows the target voltage. Due to the presence of the precision resistor forming the load for the BCD resistor network, an error equal to a single binary digit occurs between the setting code driving the network and the resultant command to the network. In respect of the setting code which is decimal derived this error is nulled by displacing the notation of the decimal lines by one digit, and in respect of the read-out, correction is accomplished by an adder network which automatically increases the total shown by one decimal unit as appropriate.

BRIEF DESCRIPTION OF THE DRAWINGS

The invention will be further described in the following description in conjunction with the accompanying diagrammatic drawings showing a preferred embodiment. In the drawings.

DESCRIPTION OF THE PREFERRED EMBODIMENTS

Figure 1:
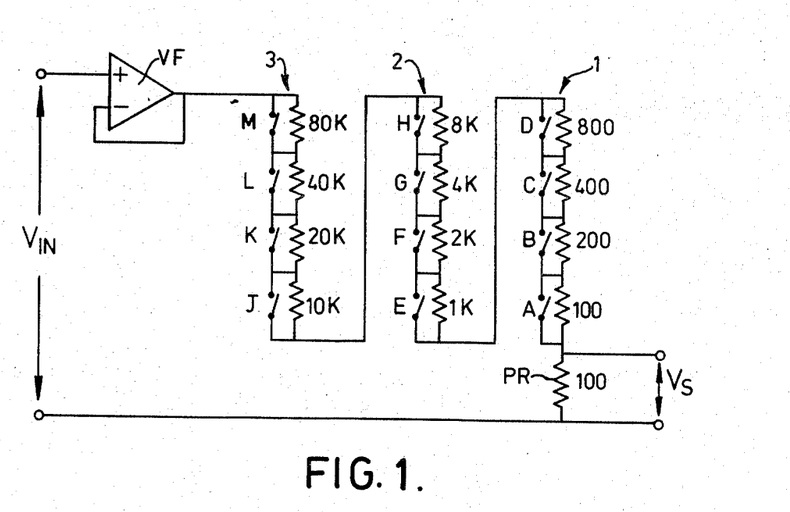
FIG. 1 shows the BCD series resistor network and input for the potential to be evaluated.

The input circuit arrangement is shown in FIG. 1. The potential to be evaluated is applied at $V_{in}$ and passes via the voltage follower VF to the BCD resistor chain comprising three decades, 1 for units, 2 for tens and 3 for hundreds. The resistors are in 8,4,2,1, ratio, and for each decade reed delay contacts A to M are provided for setting the chain. The lower end of the chain includes a precision resistor PR across which the standard output voltage $V_s$ occurs at the defined current. This resistor is equal in value to BCD 1.

Figure 2:
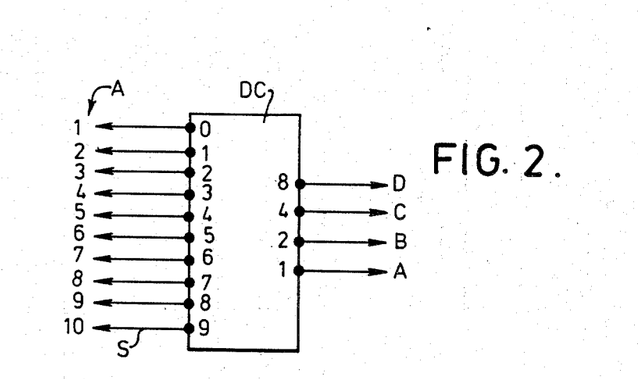
FIG. 2 shows the decimal to BCD converter for the "unit" decade.

FIG. 2 shows the decimal to BCD converter DC for setting the units decade and it will be seen that the command input lines A for the converter taken from the target value programming device are displaced by one digit from the BCD converter input lines B to take account of the resistor PR. The converter output lines in 8, 4, 2, 1, code feed the appropriate reed contacts A,B,C,D, shown in FIG. 1.

In respect of the tens, hundreds and progressively higher decades no displacement of the relationships between the command input A and coding B of the decimal to BCD converter is needed. The provision of a line coded 10 at the input to the units decade is necessary as otherwise it would not be possible to accommodate any figure containing an 0 in the units column. This line shown as S in FIG. 2 (encoded 10) drives the 9 input of the decimal to BCD converter, and in combination with the permanent BCD 1 of the resistor PR sets the resistance of the units BCD network to the value which requires the application of 10 volts to produce the current at which the standard voltage will result across the precision resistors PR. When setting up any decimal number ending in 0 a figure of 10 is deducted from the total and entered into the units decade the balance then being entered into the other decades in the normal manner.

For example, and with three decade arrangement of FIG. 1, to enter a figure of 350, 10 is first deducted from the total leaving 340. The 10 is entered in the units decade 1,4 in the tens decade 2 and 3 in the hundreds decade 3 thus the hundreds and tens sum to produce 340 which added to 10 in the units totals 350.

In this measurement technique the size of the least significant bit is largely determined by the value of the standard voltage developed across the precision resistor but in one embodiment a further decade of sensitivity is achieved by operating the isolating amplifier with a gain of 10 thereby reducing the actual input signal needed to produce the standard voltage by a factor of 10. This method of ranging permits greater sensitivities than that of the basic network to be achieved as required. To accommodate decades of voltages which are higher than those which can be accepted by the voltage follower isolating amplifier, potential divider circuits may be used across the input provided so long as the lower input impedances than that given by the voltage follower is acceptable.

Figure 3:
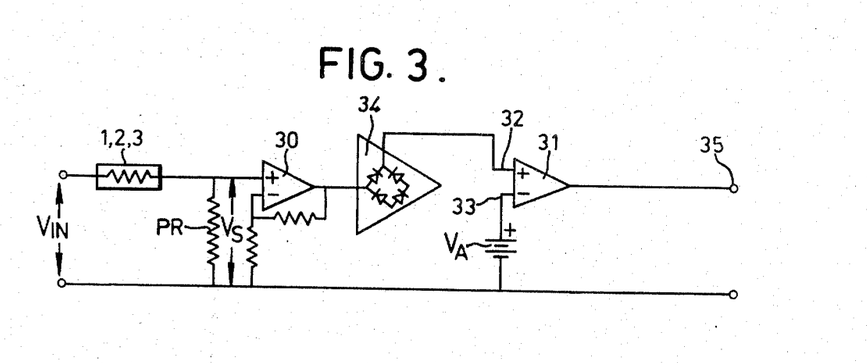
FIG. 3 shows the arrangement of the evaluating device following the BCD resistor network.

As shown in FIG. 3 the standard voltage $V_S$ is applied to a stable gain feedback controlled amplifier 30 to produce a convenient level for evaluation and which is processed to make the output single sign in converter 34 the amplified standard voltage is applied to one input 32 of a comparator 31, the input 33 is fed by a precision voltage reference $V_A$.

Figure 4:
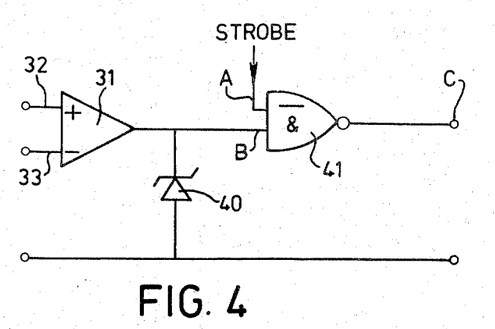
FIG. 4 shows the gating circuit following the comparator.

When the standard voltage $V_S$ across the precision resistors is of positive sign the unipolar converter 34 will have no effect and hence the signal is applied to the positive input of the comparator. The reference voltage $V_A$ which is of positive sign, is applied to the inverting input of the comparator, and in the absence of any signal to the input 32 the comparator output is negative. As the input 32 becomes progressively more positive, the input of the comparator moves from negative towards positive, and as soon as the signal at the input 32 exceeds the level of the positive reference applied to the inverting input 33 the comparator output swings positive. The rate of change is determined by the gain of the comparator. This positive output is used to drive a logic gate circuit as shown in FIG. 4 excessive outputs being prevented by a clamp 40 to prevent overdrive.

The NAND gate 41 has one input A connected to a stobing line and the other input B connected to the output of the comparator 31, the truth table for the output C of the gate is:

| A | B | C |
|---|---|---|
| High | High | Low |
| Low | High | High |
| High | Low | High |
| Low | Low | High |

When there is no strobe applied to the input A of the gate 41, then the output of the gate will be at logic 1 irrespective of the condition at input B. When the input from the comparator to B is less than + 2.8v (minimum logic 1 level) then the output C will be at logic 1 irrespective of the condition of input A. Only when inputs A and B are simultaneously at logic 1 will the output of the gate be at logic 0. This condition is met when the output of the comparator is positive and the strobe is applied.

The arrangement of FIGS. 1 to 4 form the basic test equipment when combined. Consider the assessment of a circuit parameter which must be above 10v for the circuit to operate correctly. The circuit voltage is applied to the voltage follower isolating amplifier $VF$ which passes it unaltered in magnitude to the BCD resistor network which has been set-up so that when 10v is applied across the input then the defined current will flow to produce the standard voltage $V_S$ across the precision resistor PR. This standard voltage is amplified and fed to the comparator 31 and by reason of the gain of the amplifier 30 the signal to the non-inverting input 32 is of equal magnitude to $V_A$ which is applied to inverting input 33 resulting in the comparator output resting nominally at zero. If the input signal is greater than 10v - the condition for satisfactory circuit operations - then the output of the BCD network across the precision resistor will be greater than the standard voltage and hence the signal at the non-inverting input 32 of the comparator is higher than $V_A$ which will cause the comparator to produce a positive output and feed a logic high to the gate 41. If this is supplied with a strobe high then a low signal occurs at the gate output C which indicates a satisfactory condition in the circuit under test. If the test point voltage is less than 10v - an unsatisfactory circuit condition - then the standard voltage will be low, the voltage to the input 32 of the comparator be below $V_A$ and despite a strobe high, the gate output C will remain at high.

In an automatic testing apparatus a scanner sequentially selects each test input in turn and in association with logic circuits sets up the BCD resistor network to the appropriate values in synchronism with the selection of the inputs. The operation of the whole is controlled by a continuously running clock producing logic coded sequences for the duration of the scan across the input. When the strobe is applied to the gating system subsequent to the comparator one part of the logic circuit is arranged so that a fault signal derived from the basic comparator gate stops the clocking system and signals the appropriate fault condition. The presence of a fault condition at a test point prevents further progression by the scanner.

In automatic testing equipment it is advantageous to be above to assess that a voltage at a test point line between two defined target values being the lower limit and the upper limit, and between which two limits the circuit can be said to be satisfactory. The system so far described is capable of assessing that the circuit parameter is above some defined target value or lower limit. The same arrangement is employed for assessing the circuit under test in relation to a predetermined upper limit but in this instance the logic circuit following the comparator is arranged to accept an inverted signal as satisfactory.

The BCD resistor network is common to both the high and low limit assessment which operate in a time sharing mode within the time that the input scanner remains connected with each particular test point.

Figure 5:
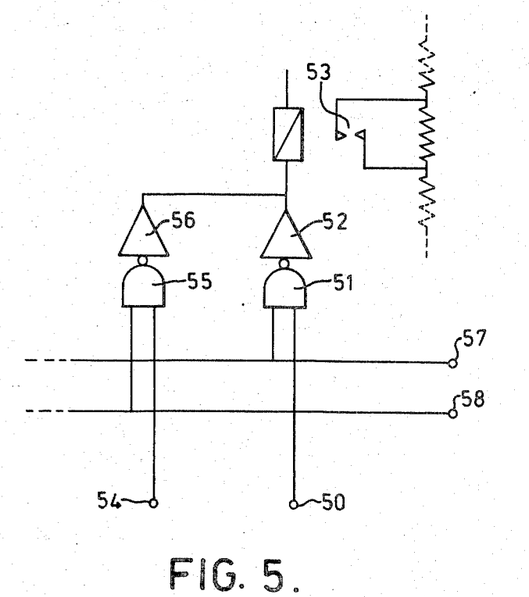
FIG. 5 shows the circuit for setting high and low target values in simplified form.

Two sets of decimal to BCD converters are provided for driving the switching means across the resistor network one of which defines the upper limit BCD resistor network values and the other the low limit values for the same network. The outputs from the converters are fed to pairs of gated drivers amplifiers whose outputs are parallel connected to drive reed switches operating the BCD resistor network. One such pair of gated drivers and the associated reed switch is shown in FIG. 5.

The high limit command from the high limit decimal to BCD converter is fed in at 50 to a gate 51 feeding the reed relay driver 52 which operates the contacts 53 across the appropriate BCD resistor in a decade. In a similar way the low limit command is fed in at 54 through gate 55 and to driver 56. The driver outputs are connected together. Each gate is also fed from a strobe line, the strobe line 57 for the high limit setting and the line 58 for the low limit.

At the appropriate time within the testing sequence the high limit BCD commands are set on the series resistor network by the application of a signal to the strobe line 57.

After the high limit evaluation has been made, and provided the test is satisfactory, the strobe signal is removed from line 57 and, after a short delay a low limit strobe signal applied to line 58 to set the series resistor network to the low limit value.

This method ensures that any errors present in the BCD resistor network are common to both high and low limit settings and removes any possibility of diverging inaccuracies between high and low limit settings.

Figure 6:
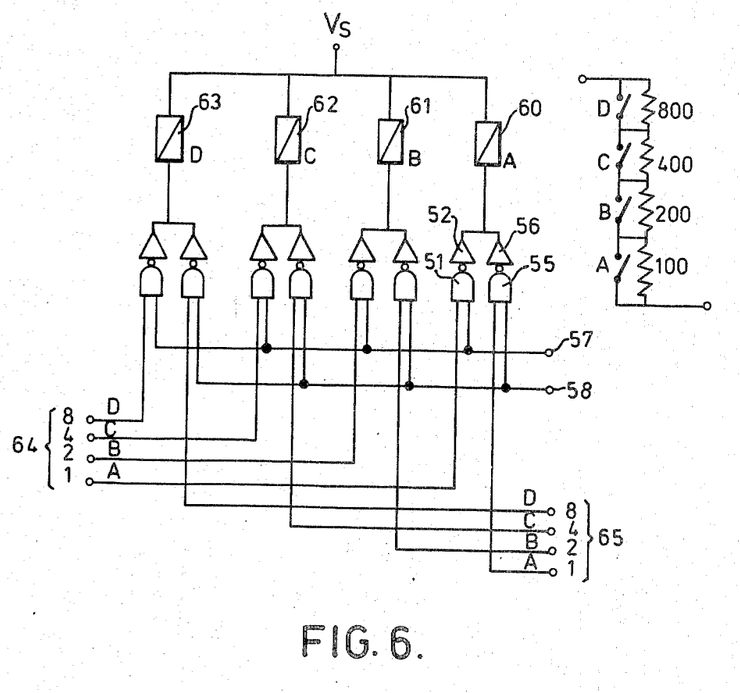
FIG. 6 shows the gating for setting one BCD resistor network.

FIG. 6 shows the setting arrangement for one resistor decade comprising resistors with a respective reed contact A,B,C,D, operated by coils 60,61,62,63 respectively. For every decade of BCD resistors a similar arrangement to that shown in FIG. 6 is used. Each relay coil is energised by a driver one 52 for the high limit setting and another 56 for the low limit setting. Each driver is fed via an appropriate upper or lower limit gate 51 or 55. One input of each of the gates 51 is fed with the appropriate setting command input in BCD, for the upper limit setting of the resistors by lines 64 from the upper decimal to BCD converter. Each gate 51 has its other input connected to the high limit setting strobe line 57.

The inputs to the gates 55 comprise the appropriate line from the lower command input 65 from the lower limit decimal to BCD converter, and the lower limit setting strobe line 58.

The upper and lower limits are thus present on the lines 64 and 65 and the setting of the resistor network 60 to 63 for high or low limit is controlled by the appropriate gating signal from the strobe line 57 or 58.

Figure 7:
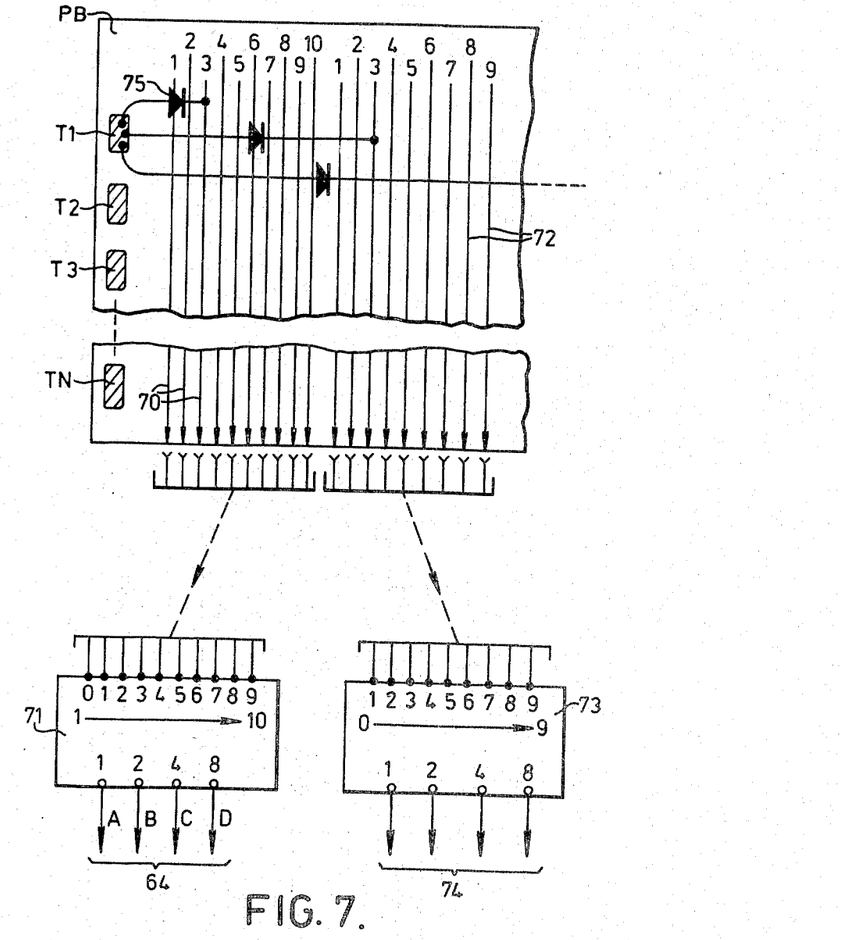
FIG. 7 shows the programming board for setting one decade in the resistor network.

The BCD driver arrangement of FIG. 6 is commanded from decimal to BCD converters operated from a diode memory matrix forming a programming means and illustrated in FIG. 7.

As shown the matrix comprises a printed circuit board PB carrying a number of sets of parallel arranged conductor strips the sets forming the programming lines for setting the units, tens and progressively higher decades. The set of conductors 70 for the units comprise ten lines, each corresponding to a unit digit 1 to 10, each line being connected to an input of a decimal to BCD converter 71. The numeration of the lines is displaced from that of the converter, to allow setting of a decimal number ending in a zero, as previously explained. The output lines 64 of the converter 71 connect with the input 64 of FIG. 6.

A second set of conductors 72 forms the programming lines for the tens decade and feeds a second decimal to BCD converter 73 the output lines 74 of which feed a circuit arrangement similar to that of FIG. 6 but setting the tens decade of the series resistors. Further programming lines and associated decimal to BCD converters for hundreds and higher decades may be provided, arranged on the same or associated boards.

Along the side of the board PB are a number of terminals $T_1, T_2, T_3,$ to $T_n$ one terminal being provided for each test point input accepted by the apparatus and each terminal is fed in turn with a positive voltage in synchronism with the input scanner which selects the actual test point to be examined.

Each terminal is connected through a steering diode 75 to one line in each of the conductor sets to programme the appropriate numerical value of limit voltage to be set for that input. For example at 71 the value 3 is programmed in the units and 3 in the tens producing at the converter output 64 and 74 the appropriate BCD signals for setting the series resistor network decades.

A second board similar to FIG. 7 is used for setting the other value of limit voltage so that one board carries the information for the upper limits of all test points and the other board the lower limits.

In the case of a printed circuit board testing apparatus the diode matrix board PB for programming is arranged together with a mounting for the printed circuit board to be tested on a frame detachable from the main apparatus, the steering diodes 75 being connected by a user to programme the target values for each test.

Figure 8:
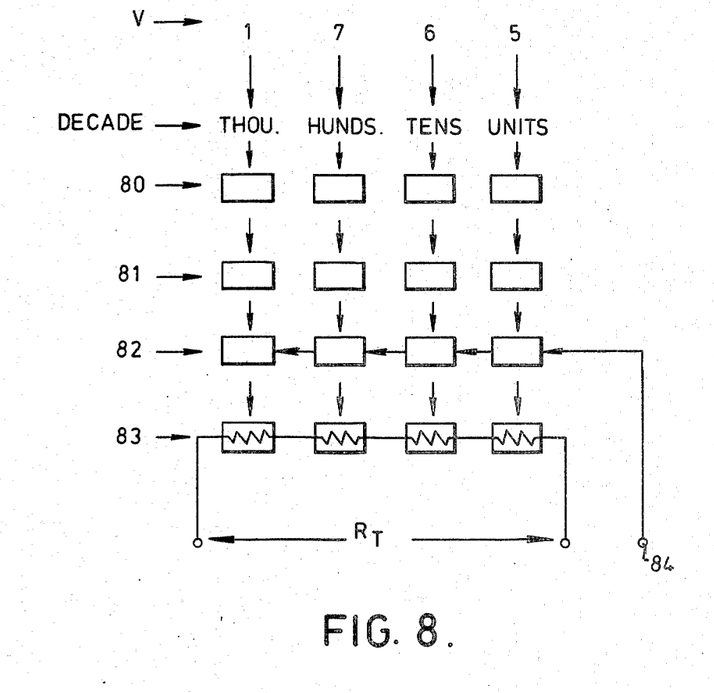
FIG. 8 shows the arrangement in block form of four decades.

FIG. 8 shows the schematic for programming four decimal digits giving a target value V 1,765. In this case the board PB would carry four sets of conductors and one terminal would be connected in each case through a diode to the line 1 in the thousands, line 7 in the hundreds, line 6 in the tens and line 5 in the units. Each set of conductors feeds a decimal to BCD converter 81 which in turn controls the switching means 82, which when activated by the strobe 84 sets the BCD decade series resistor 83 across which the test potential is applied. The resultant total resistance $R_T$ produces the standard voltage across the precision resistor when the programmed value 1,765 is present.

Figure 9:
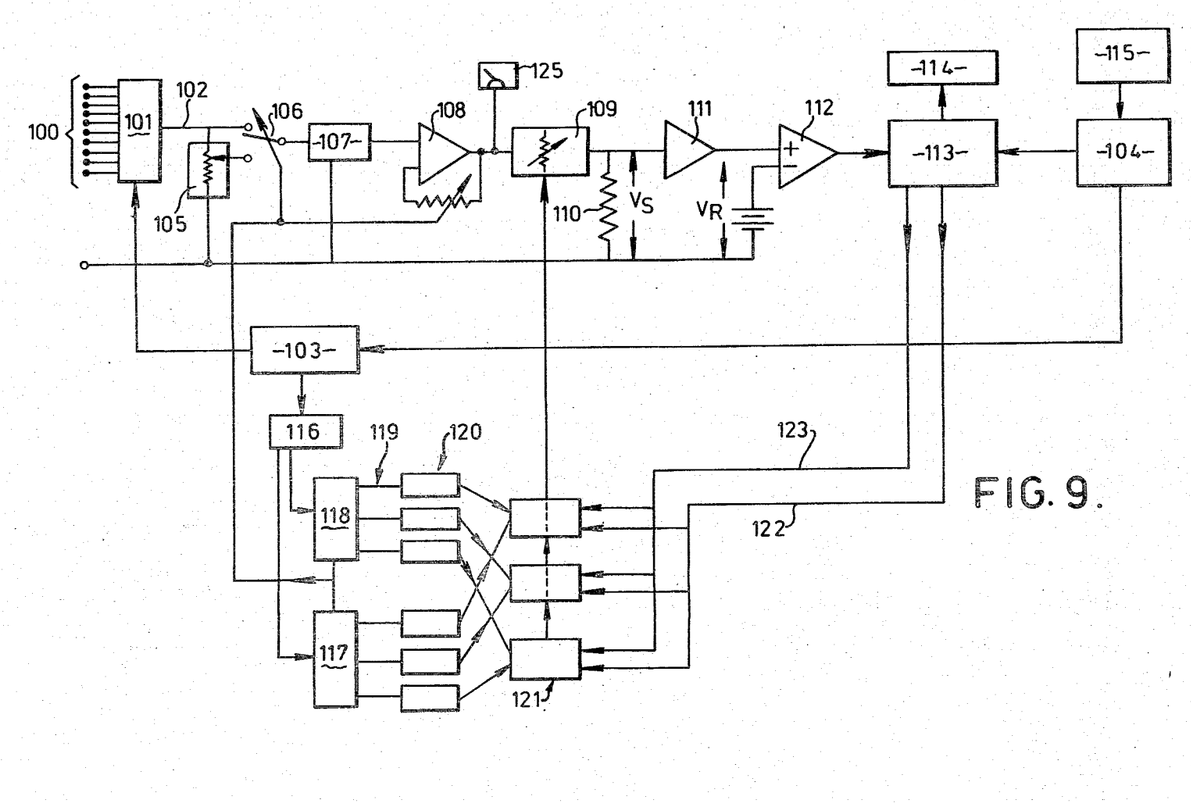
FIG. 9 is a diagram showing the overall arrangement of the test apparatus.

FIG. 9 shows the overall arrangement of a testing apparatus. Each test point 100, to be evaluated is connected in sequence to the input 102 of the apparatus by a scanner 101 which may comprise a number of reed switches driven by a logic control circuit 103 commanded by a master clock 104. The evaluating apparatus is arranged to accept potentials within certain limits and for inputs above the limit a pre-ranging voltage divided network 105 is provided placed in circuit by a switch 106. The input potential is fed, via an overvoltage protection device 107, to an isolating amplifier 108 normally arranged to have unity gain. The amplifier 108 may, however, be set to produce a voltage gain for input signals lying below the normal range of the apparatus.

Across the output of amplifier 108 is connected the BCD series resistor network 109 and precision resistor 110 arranged as described in FIG. 1. The standard voltage $V_s$ appearing across resistor 110 is fed to a processing amplifier 111 the output of which is passed to the positive input of a comparator 112. To the negative input of the comparator is applied a reference voltage $V_r$. The output of the comparator is evaluated by a logic network 113 and the signal sensed according to whether a high or low limit is being evaluated, the logic network 113 controlling the apparatus fault statement displays 114. The logic network is controlled by the clock 104 which is itself controlled by the operational command 115.

The BCD resistor decades 109 are set according to a programme defining for every input to be tested a high and a low limit, the programme being written in decimal decades. For each test point the high/low limits are called up by a diode matrix drive 116 driven by the logic control 103. The matrix drive commands the limit values from the upper limit set 117 and lower limit set 118.

The sets (117/118) each have three decades in the present example and the decade output lines 119 each pass to a decimal to BCD converter 120. The output from the converters in 8,4,2,1, BCD are fed to appropriate switching means 121 for each decade, the switching effecting shorting of the appropriate resistors in the network 109. Each switching means incorporates a gating circuit whereby either the high limit or low limit value from either set 117 or 118 is established on the network 109 according to an appropriate set high strobe signal at line 122 or set low strobe signal at line 123. The appropriate strobe signal is derived from the logic network 113.

The matrix 118/117 may also include information as to any ranging to be performed for a test input and accordingly may command the range switch 106 or amplifier 108.

At the output of the amplifier 108 read out of the input signal value may be provided by a meter 125 or digital display.

As the limit values for a test are held permanently in the diode matrix further circuits may be provided whereby the values for a test input are read and displayed by the apparatus using the matrix as a store.

I claim:

1. An improvement in an apparatus for automatically evaluating a plurality of test-point voltages derived from an electrical circuit using a scanner for sequentially sampling each test-point in turn and connecting same to a testing circuit, wherein the improvement comprises an isolating amplifier connected to the scanner and having an output, a plurality of resistors in series that include a precision resistor at one end of the series, the plurality of resistors being connected across the amplifier output, switching means operating in synchronism with the scanner to set the value of the resistor series in conjunction with the precision resistor to produce a predetermined division ratio of the test point voltage, a reference voltage source, a comparator having one input connected across the precision resistor, a second input connected to said voltage source and an output, and a sensing circuit connected to the comparator output to determine the direction of deviation of the voltage produced across the precision resistor from the reference voltage.

2. An apparatus as claimed in claim 1, wherein the series of resistors are arranged in a number of decades, each decade being in a 8.4.2.1 binary coded decimal sequence ratio, and there is provided a contact device operated by the switching means to shunt each resistor.

3. An apparatus as claimed in claim 1, wherein the switching means includes gating means connected to the series of resistors for setting the series of resistors to a value for comparing an upper limit of input voltage and a value for comparing a lower limit of input voltage in turn for each test point sampled by the scanner, and a control circuit for controlling the switching means and scanner and also setting the sensing circuit to determine whether the voltage fed to the comparator is above or below the reference voltage.

4. An apparatus as claimed in claim 2, wherein there is provided means for controlling the switching means that includes a decimal to binary-coded-decimal converter having an output to drive the contact device, and program means for feeding a signal to the last mentioned converter.

5. An apparatus as claimed in claim 4 wherein the amplifier is an adjustable gain amplifier and that the program means includes means for varying the gain of the amplifier to alter the input range of the apparatus.

6. An apparatus for evaluating the voltage derived from a number of test-points on a printed circuit board or electronic assembly comprising,
   a. a scanner for sequentially connecting with one of a number of test-point inputs,
   b. an isolating amplifier connected with the scanner,
   c. a number of resistors in series including a precision resistor and connected across the output of the isolating amplifier,
   d. a comparator having one input connected to the precision resistor,
   e. a reference voltage source connected to the other input of the comparator,
   f. a sensing circuit connected to the comparator output to determine the direction of deviation of the voltage across the precision resistor from the reference voltage,
   g. a switching means operating in synchronism with the scanner to set the value of the resistor series,
   h. contact devices across each resistor in the series and controlled by the switching means, and
   i. a panel detachable from the apparatus having
      1. means for making connection with points on a printed circuit board mounted thereon and connecting same to the test-point inputs,
      2. a program means for connection with the switching means to control same to set the value of the series of resistors.

7. An apparatus as claimed in claim 6, wherein an analogue or digital voltage indicating means is connected to the output of the isolating amplifier to indicate the value of input potential at a test-point.

8. An apparatus as claimed in claim 6, wherein said program means defines upper and lower limits of acceptable voltages at each test point for setting the sensing circuit and switching means according to the limit being evaluated for each test point.

* * * * *